No. 840,362. PATENTED JAN. 1, 1907.
R. H. PARTRIDGE.
APPARATUS FOR RECOVERING PRODUCTS FROM VEGETABLE MATTER.
APPLICATION FILED AUG. 21, 1905.
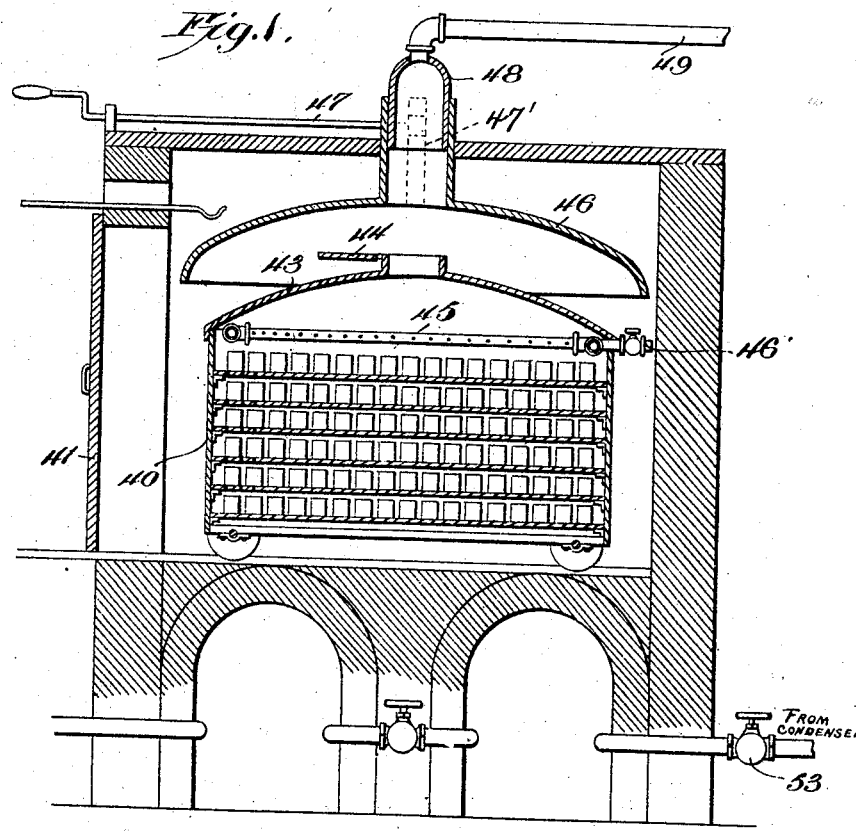
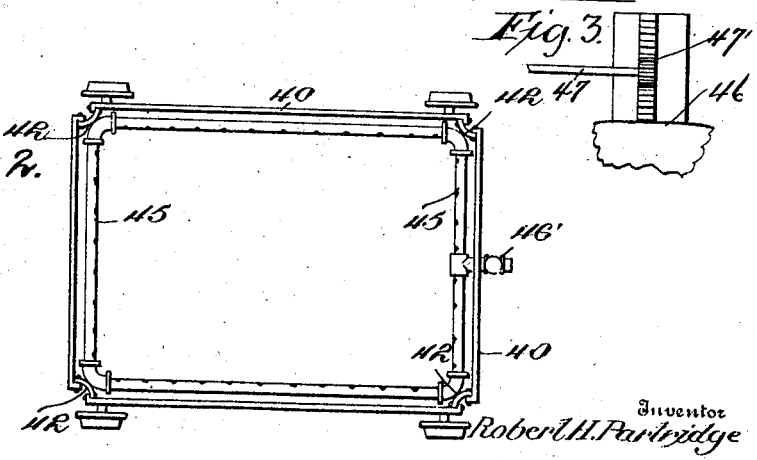

UNITED STATES PATENT OFFICE.

ROBERT H. PARTRIDGE, OF BROADRUN, VIRGINIA.

APPARATUS FOR RECOVERING PRODUCTS FROM VEGETABLE MATTER.

No. 840,362.      Specification of Letters Patent.      Patented Jan. 1, 1907.

Application filed August 21, 1905. Serial No. 275,103.

*To all whom it may concern:*

Be it known that I, ROBERT H. PARTRIDGE, of Broadrun, in the county of Fauquier and State of Virginia, have invented certain new and useful Improvements in Apparatus for Recovering Products from Vegetable Matter; and I do hereby declare the following to be a full, clear, and exact description of the invention, such as will enable others skilled in the art to which it appertains to make and use the same.

This invention relates to certain new and useful improvements in apparatus for recovering products from vegetable matter.

The invention has for its object the production of an apparatus by means of which alcohol, acetic acid, acetone, creosote, tar, and other similar products may be economically produced and the residuum converted into charcoal.

The invention will be hereinafter fully set forth, and particularly pointed out in the claims.

In the accompanying drawings, Figure 1 is an enlarged sectional view of the oven with loaded car therein. Fig. 2 is a plan view of the car. Fig. 3 is a detail.

In practice my invention is intended for the treatment of the waste products remaining after the extraction of tannic acid according to the method described in my pending application for patent, Serial No. 231,489, filed November 5, 1904; but the same is not limited in this particular, as other materials, such as mill waste and the like, may be utilized for the same purpose, or where such waste products are not available the wood may be specially prepared for treatment according to the present invention.

The material to be treated is first pressed into any desired shape by means not shown, and the briquets thus formed are loaded into a car 40, composed of sheet metal, the sides thereof being bolted to angle-uprights 42, whereby said cars may expand and contract without pulling the securing-rivets loose. Each car is also provided with a lid 43, having a hinged or removable cap 44 and a perforated coil 45, provided with a coupling or connection 46'. When the car has been placed in oven 41, the cap 44 is swung back or removed, the car being placed directly beneath the dome 46. By means of a shaft 47 and gear 47' said dome is adjusted vertically. The dome 46 is provided with an outlet-sleeve 48, which communicates with a pipe 49, the latter pipe leading to a condenser. (Not shown.) One product of the resulting distillation passes out through the condenser in the form of fuel-gas and after being passed through a suitable washer (not shown) is conducted by pipe 53 to burners under the oven 41, where it is utilized as part of the heating medium of the latter. The other products of the distillation—such as alcohol, acetic acid, acetone, creosote, tar, &c.—after leaving the condenser are recovered in any preferred manner. The briquets in car 40 under the action of the heat are relieved of all moisture and converted into charcoal. In order to remove the same, the cap 44 is closed and the car withdrawn from the oven. Before removing the lid 43, however, water is sprayed upon the briquets to cool them and prevent ignition when said lid or cover is removed.

The advantages and operation of my improved apparatus will be at once apparent from the foregoing. It will be particularly observed that I have produced means for distilling wood and at the same time converting the same into charcoal and that the same is specially adapted for the treatment of waste products. It will also be observed that by providing an adjustable dome the same may be readily elevated so as not to interfere with the car as it enters the oven and also to allow the same to be lowered closely over the car after the latter enters the oven to insure the catching of all vapors. It also permits variation in the sizes of the cars. It will also be observed that I have produced simple and efficient means for securing the adjustability of the dome.

I claim as my invention—

1. An apparatus of the character described comprising an oven, a receptacle adapted to be placed therein, an adjustable dome located in said oven, and means connected with said dome for conducting off the vapors arising from said receptacle.

2. An apparatus of the character described comprising an oven, a receptacle removably located therein and provided with an outlet-opening, a conduit for conducting off the vapors passing through said outlet-opening, and adjustable means interposed between said outlet and said conduit for directing the vapors into said conduit.

3. An apparatus of the character described comprising an oven, a normally closed receptacle removably located therein, an adjustable dome located in said oven above said receptacle, said receptacle and dome provided with outlets in line with each other, and means connected with said dome for conducting off the vapors passing out of said outlet-opening.

4. An apparatus of the character described comprising an oven, a normally closed receptacle located therein and provided with an outlet-opening, a dome located in said oven above said receptacle, means for adjusting said dome, and means connected with said dome for conducting off the vapors passing out of the outlet-opening of said receptacle.

5. An apparatus of the character described comprising an oven, a normally closed receptacle therein provided with an outlet-opening, a dome located in said oven and provided with an outlet-sleeve located in juxtaposition with said outlet-opening, and means connected with said sleeve for conducting off the vapors passing through said outlet-opening.

6. An apparatus of the character described comprising an oven, a normally closed receptacle located therein and provided with an outlet-opening, a dome located in said oven and provided with an outlet-sleeve located in juxtaposition to the outlet-opening of said receptacle, means for adjusting said dome, and means connected with said sleeve for conducting off the vapors passing through said outlets.

7. An apparatus of the character described comprising an oven, a normally closed receptacle located therein and provided with an outlet-opening, a dome located in said oven and provided with an outlet located in juxtaposition with the outlet-opening in said receptacle, and a pipe leading from the outlet of said dome.

8. An apparatus of the character described comprising an oven, a closed car or receptacle provided with a removable cover having an outlet-opening, a closure for said opening, a spray-pipe located in said car, and means connected with said oven for conducting off the vapors passing through said outlet-opening.

In testimony whereof I have signed this specification in the presence of two subscribing witnesses.

ROBERT H. PARTRIDGE.

Witnesses:
M. E. PALMER,
W. H. DAVIS.